United States Patent [19]

Brambilla

[11] 4,445,598

[45] May 1, 1984

[54] TWO-TUBE TELESCOPIC HYDRAULIC SHOCK ABSORBERS

[75] Inventor: Guido Brambilla, Turin, Italy

[73] Assignee: Societa Impianti Elettrici Telefonici Telegrafici E Costruzioni Edili S.p.A., Italy

[21] Appl. No.: 376,166

[22] Filed: May 7, 1982

[30] Foreign Application Priority Data

May 8, 1981 [IT] Italy .............................. 67627 A/81

[51] Int. Cl.³ ............................................. F16F 9/06
[52] U.S. Cl. ............................... 188/322.16; 188/315; 188/322.17
[58] Field of Search .............. 188/315, 322.17, 322.21, 188/318, 322.16; 267/126, 136

[56] References Cited

U.S. PATENT DOCUMENTS

| | | | |
|---|---|---|---|
| 4,005,769 | 2/1977 | Itoh | 188/315 |
| 4,085,925 | 4/1978 | Peddinghaus et al. | 188/315 |
| 4,108,287 | 8/1978 | Kato | 188/315 |
| 4,166,523 | 9/1979 | Fujii et al. | 188/322.17 |

FOREIGN PATENT DOCUMENTS 2257556  3/1974  Fed. Rep. of Germany ...... 188/315

Primary Examiner—Duane A. Reger
Assistant Examiner—Alvin Obenley
Attorney, Agent, or Firm—James B. Raden; William J. Michals

[57] ABSTRACT

The shock absorber is of the type in which there is gas under pressure in the interspace between the two coaxial tubes or cylinders.

In order to prevent the gas under pressure from reaching the upper part of the shock absorber and at the same time allow the hydraulic fluid which has been drawn to the upper part of the shock absorber to descend to the interspace, an annular gasket of elastomeric or similar material with an inverted U- or V-shaped cross-section is arranged in the upper part of the interspace to form an annular channel which is open at the bottom and defined by two annular lips engaging with the inner cylinder and the outer cylinder respectively. One of these lips may separate elastically from the respective cylinder so that oil may descend into the interspace. This deformable lip engages the respective cylinder in an annular zone below the rim at the upper end of the inner cylinder.

8 Claims, 4 Drawing Figures

TWO-TUBE TELESCOPIC HYDRAULIC SHOCK ABSORBERS

BACKGROUND OF THE INVENTION

The present invention relates to a two-tube hydraulic shock absorber comprising coaxial outer and inner tubes or cylinders which between them define an interspace, wherein a piston is slidable in the inner cylinder and includes a rod which projects from an upper end of the shock absorber through an annular head common to both cylinders, the head having an annular radial layer shoulder which engages axially a rim at the upper end of the inner cylinder, wherein the head includes a bush in which the rod is slidable, and the head is formed with an annular reservoir overlying the bush for receiving hydraulic fluid which is drawn between the rod and the bush from the chamber in the inner cylinder, radial passages interconnecting the reservoir and the upper part of the interspace, and wherein the interspace contains gas under pressure, one-way sealing means being provided to prevent the gas under pressure from reaching the passages and at the same time to allow oil to descend into the interspace through the passages.

Throughout the present specification and claims terms such as 'upper', 'lower', and the like refer to the normal arrangement of a shock absorber installed in a motor vehicle suspension.

For some time two-tube shock absorbers have been known and used, in which the interspace between the two tubes or cylinders contains a gas under pressure. This gas under pressure acts on the reserve of hydraulic fluid in the lower part of the interspace and offers various advantages, among which is the reduced likelihood of the hydraulic fluid emulsifying or the fluid column being disrupted. By virtue of this pressurization, the hydraulic fluid can more readily reach the spaces which become available when the shock absorber is in use, and the latter can better fulfil its proper function.

Simple pressurization of a normal two-tube shock absorber is sufficient to improve its performance in the manner described above: the construction must be modified so that the gas exerts pressure only on the free surface of the hydraulic fluid in the lower part of the interspace and cannot reach the reservoir in the head, since in this case the gas under pressure passes through the interspace between the bush and the rod to act on the hydraulic fluid contained in the upper part of the inner cylinder above the piston. In this case, the levels of the hydraulic fluid in the inner cylinder and the interspace will tend, by the principle of communicating vessels, to equalize in an undesirable manner. On the other hand, the hydraulic fluid which is drawn to the reservoir between the bush and the rod must be able to flow back to the reserve in the interspace, such as occurs in non-pressurized two-tube shock absorbers. In order that this may happen without the transfer of gas under pressure to the reservoir in the head, one-way sealing means are associated with the latter, as known in the art.

In one embodiment, known from German Patent application No. 28 08 481 of Feb. 28th, 1978, the one-way sealing means comprise a skirt of rubber or a similar material which surrounds the head in the area where the radial downflow pipes emerge from the reservoir.

In another known embodiment, the reservoir in the head is absent and the hydraulic fluid drawn between the bush and the rod flows down radially over the head itself to feed longitudinal channels in the head, which in turn communicate with the interspace. At the entrance to the channels, the head incorporates a one-way annular valve with the above-described function.

Neither of the two known solutions take account of the fact that in two-tube shock absorbers the head is coupled to the inner cylinder by means of an annular boss inserted in the upper part of the inner cylinder, and by means of a radial shoulder which abuts the rim at the upper end of this same cylinder. This is not a very accurate coupling, since the shock absorber cylinders and the head are manufactured to rather wide tolerances. The coupling between the inner cylinder and the head does not afford tight sealing for the fluids and even less so for gas under pressure which may be drawn from the interspace directly into the upper space of the inner cylinder and give rise to the drawbacks which the above-mentioned one-way sealing means tend to eliminate.

If it is wished to use known one-way sealing means of the above type, an airtight seal has to be provided in the coupling between the inner cylinder and the head, for example, using an additional gasket, and this increases the cost.

The problem which forms the basis of the present invention is that of providing a two-tube hydraulic shock absorber which uses gas under pressure and does not have the above-mentioned disadvantage.

SUMMARY OF THE INVENTION

The present invention solves this problem by means of a shock absorber of the aforesaid type, characterised in that the sealing means comprise an annular gasket of elastomeric or similar material which has an inverted U- or V-shaped cross-section and is arranged in the upper part of the space so as to form a downwardly open annular channel defined by two annular lips engaged with the inner cylinder and the outer cylinder respectively, one of which deforms elastically to separate from the respective cylinder and enable the descent of oil into the interspace, the deformable lip engaging the respective cylinder in an annular zone situated below the rim at the upper end of the inner cylinder, and in that the deformable lip has an external face with a longitudinal profile which diverges upwardly relative to its respective cylinder so that between the lip and the cylinder is defined an annular passage normally closed at its lower end by the contact between the lip and the cylinder.

In a shock absorber according to the invention, the sealing means formed by the gasket lie entirely downstream of that part of the return path of the oil to the interspace where there are areas susceptible to poor sealing in the presence of the gas under pressure, and in particular are downstream of that area formed by the coupling between the head and the inner cylinder. In these conditions, no means are required to seal this coupling.

BRIEF DESCRIPTION OF THE DRAWING

Further characteristics of the invention will become apparent from the following detailed description made with reference to the attached drawings, which are given by way of non-limiting example, in which.

DETAILED DESCRIPTION

Figure 1:
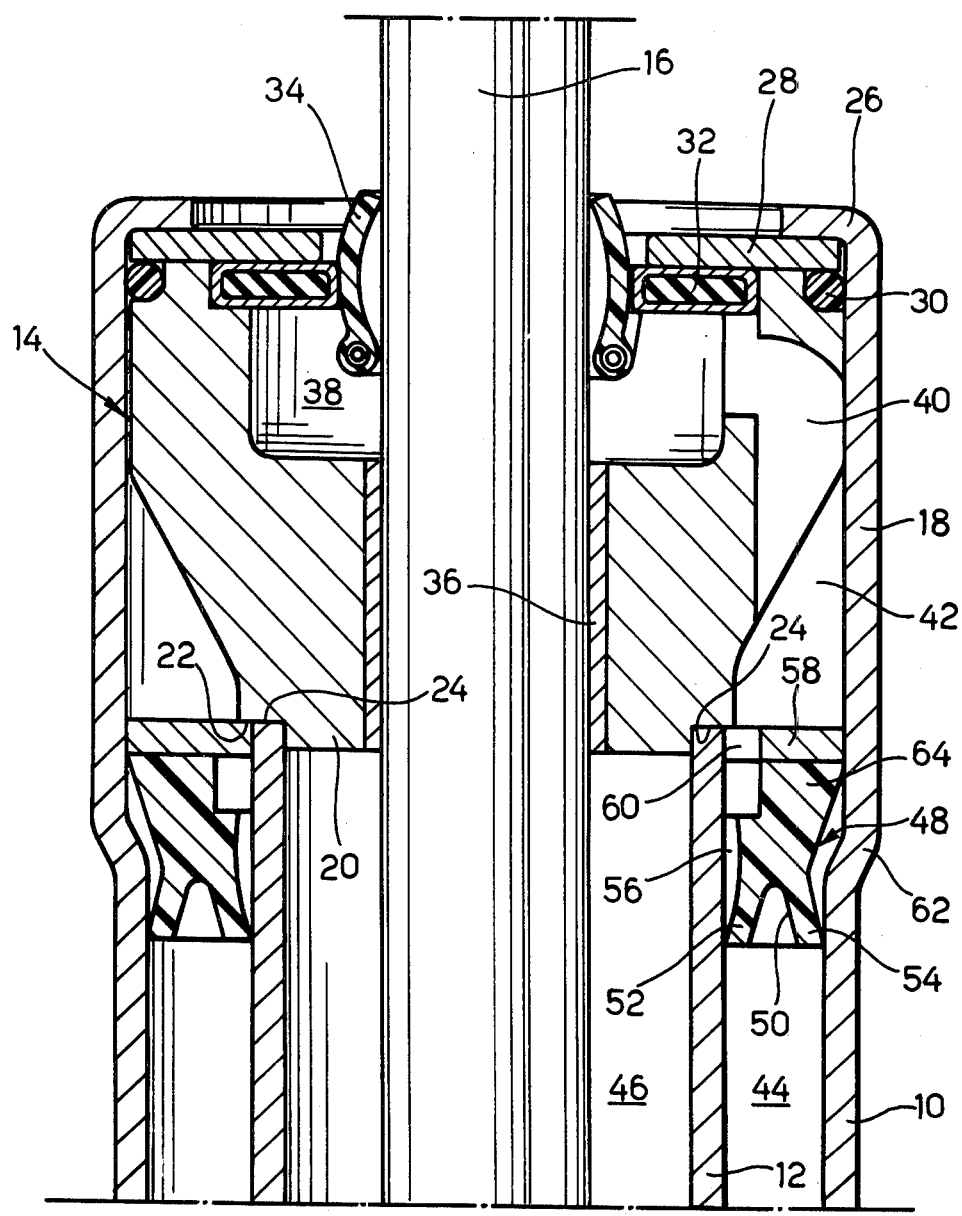
FIG. 1 is an axial section of the upper part of a shock absorber which incorporates a gasket according to a first embodiment of the invention.

With reference to FIG. 1, a two-tube hydraulic shock absorber comprises coaxial inner and outer tubes or cylinders, 10,12. At the upper end, the two cylinders 10, 12 are closed by a common annular head 14.

Slidable in the inner cyliner 12 is a valved piston (not shown) fitted with a rod 16 which projects from the upper end of the shock absorber.

The head 14 has a cylindrical peripheral surface which is coupled to a widened upper part 18 of the outer cylinder 10.

In its lower part, the head 14 has an annular boss 20 which is inserted into the upper end of the inner cylinder 12. At its lower end, the boss 20 is surrounded by the surface of an annular radial shoulder 22 which abuts the annular rim at the upper end 24 of the inner cylinder 12. This arrangement both ensures that the upper parts of the two cylinders 10,12 are coaxial, and axially locks the inner cylinder 12.

The head 14 is retained in the widened part 18 by means of an upper annular bead 26 on the outer cylinder 10 and an interposed flat washer 28. Between the washer 28 and the head 14, is interposed a seal comprising a peripheral toroidal gasket 30 and a flat annular gasket 32. The rod 16 is engaged by a further gasket 34 with a sliding lip.

The head 14 has a central hole in which is force-fitted a bush 36 forming a sliding bearing for the rod 16. Preferably, the bush 36 comprises an annular steel element which is split longitudinally and has a coating of porous copper impregnated with polytetrafluoroethylene on its inner surface.

Above the bush 36, in the head 14, is a reservoir from which passages 40, one of which is shown, branch-off radially. Each of these passages emerges in an annular space 42 between the head 14 and the widened part 18 of the outer cylinder 10. This annular space lies above the annular interspace 44 between the two cylinders 10,12.

Each time the shock absorber extends, a certain quantity of hydraulic fluid (oil) will inevitably be drawn from the chamber 46 of the inner cylinder 12 to the reservoir 38 through the clearance which exists between the latter and the inner surface of the bush 36 for sliding of the rod 16. The fluid accumulates in reservoir 38 until it forms a head, whereupon it spills over into the passages 40 and reaches the annular space 42. As will be seen, the hydraulic fluid is finally able to descend from this space to the interspace 44 to join the fluid reserve in the latter.

The coupling between the head 14 and the inner cylinder 12, of which the boss 20 and the shoulder 24 form part, is not strictly liquid-tight and some of the hydraulic fluid may creep into this coupling to gain direct access to the space 42 from the chamber 46.

The shock absorber under consideration is of the pressurized type in which there is gas under pressure (at a pressure of 4–5 bars, for example) in the interspace 44 above the hydraulic fluid reserve contained therein.

The interspace 44 is separated from the annular space 42 by a one-way sealing gasket 48. The latter is an annular gasket of elastomeric or similar material, and is arranged in the upper part of the interspace 44. It has an inverted U- or V-shaped cross-section so as to form a channel 50 which opens downwardly, that is, towards the interspace 44. The channel 50 is defined by two annular lips 52,54. The lip 52 which engages the inner cylinder 12 is elastically deformable, and the lip 54 engages the outer cylinder 10.

The external face of the deformable lip 52, that is, its face which faces the inner cylinder 12, has a longitudinal profile which diverges upwardly relative to the cylinder 12, so that an annular passage 56 is defined between the lip and the cylinder. The passage 56 is normally closed at the bottom due to contact between the lip 52 and the cylinder 12.

The gasket 48 has a flat upper face to which is bonded an upper reinforcing washer 58. The shoulder 22 of the head 14 projects radially outwards relative to the inner cylinder 12 and the washer 58 has a radially-internal flat annular edge which engages the projecting part of the shoulder 24 to resist the upward thrust which the underlying gas under pressure exerts on the gasket 48.

Figure 2:
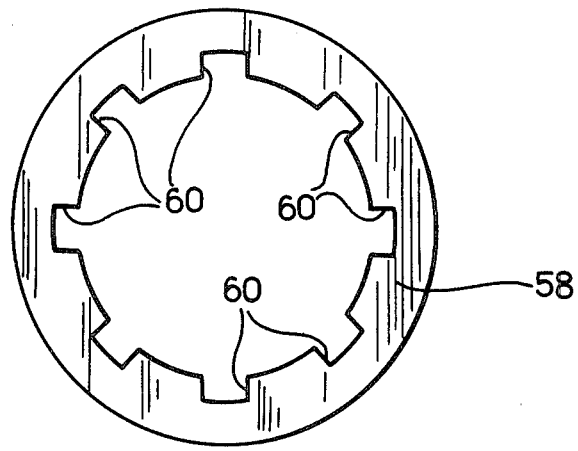
FIG. 2 is a plan view of a washer connected to the gasket in FIG. 1.

As better illustrated in FIG. 2, the washer 58 has a ring of notches 60 in its internal annular edge, which expose corresponding parts of the mouth of the passage 56.

The widened part 18 of the outer cylinder 10 joins the remainder of the cylinder at a flared portion 62. The gasket 48 has a widened upper part 64 which overlies the flared portion 62 and prevents the gasket from dropping into the interspace 44.

The gasket 48 behaves as follows: when the shock absorber has completed a contraction, the gas pressure in the interspace 44 keeps the lips 52,54 tight against the respective cylinders 12,10, so that the gas cannot ascend to the annular chamber 42. This ensures that the gas cannot reach the chamber 46 of the inner cylinder 12 in an undesirable fashion, by being drawn either along the bush 36 or following a more direct course through the afore-mentioned coupling between the head 14 and the cylinder 12.

When the shock absorber completes an extension, however, the hydraulic fluid within the chamber 42 and the passage 56 may flow down into the interspace 44 since the pressure decrease in the latter and the pressure increase in the chamber 42 cause the lip 52 to move away from the cylinder 12.

Figure 3:
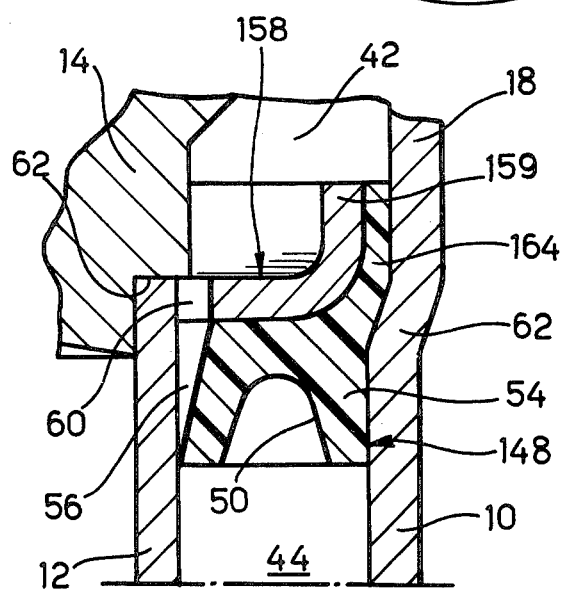
FIGS. 3 and 4 are fragmentary side elevational views of two other embodiments of the gasket according to the invention.

FIG. 3 shows a second embodiment of the gasket 148. The parts of the gasket 148, together with the illustrated parts of the shock absorber, which correspond to parts shown in FIG. 1 have the same reference numerals and will not be described again.

The gasket 148 differs from the gasket 48 in that the reinforcing washer 158 has an upwardly-turned peripheral flange 159 adjacent the widened part 18 of the outer cylinder 10. The flange 159 overlies the flared part 62 of the outer cylinder.

The gasket 148 has a widened upper part 164 formed by a layer which is bonded to the peripheral flange and completely fill the annular space between the flange 159 and the flared parts 62 of the widened part 18 of the outer cylinder 10. Due to its shape, the gasket 148 is firmly held in the outer cylinder 10 in correspondence with the flared part 62, preventing the gasket itself from dropping into the interspace 44.

As in the embodiment of FIG. 1, any reascent of the gasket due to the gas pressure is prevented by the abutment of the internal annular edge of the washer 158 against the projecting part of the shoulder 22 of the head 14.

Figure 4:
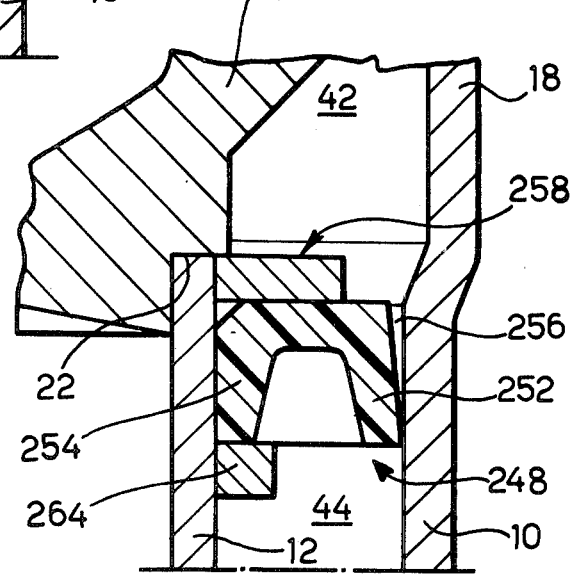

FIG. 4 shows a third embodiment of the gasket, generally indicated 248.

The shock absorber parts illustrated in FIG. 4 have been shown with the same reference numerals as FIG. 1 and will not be described again.

The gasket 248 differs from the gaskets 48, 148 in that its resiliently deformable lip 252 engages the outer cylinder 10 and defines the passage, 256 therewith. The other lip 254 is tightly engaged with the inner cylinder 12.

A flat reinforcing washer 258 is also fitted to the gasket 248. The radially-internal edge of the washer 258, which in this case has no notches, also abuts the projecting part of the shoulder 22 of the head 14.

The washer 258 is of such a diameter that its radially-external circular edge is spaced from the outer cylinder 10 to expose the mouth of the passage 256.

Any descent of the gasket 248 into the interspace 44 is prevented by the presence of a collar 264 which abuts the lower edge of the lip 254. The collar 264 is formed by a square-sectioned metal ring force-fitted onto the inner cylinder 12.

I claim:

1. A two-tube hydraulic shock absorber comprising coaxial inner and outer tubes or cylinders which define an interspace therebetween, wherein a piston is slidable in the inner cylinder and includes a rod which projects from an upper end of the shock absorber through an annular head common to both cylinders, the head having an annular radial lower shoulder which engages axially a rim at the upper end of the inner cylinder, wherein the head includes a bushing in which the rod is slidable and the head is formed with an annular reservoir overlying the bushing for receiving hydraulic fluid which is drawn between the rod and the bushing from the chamber of the internal cylinder, radial passages interconnecting the reservoir and the upper part of the interspace, and wherein the interspace contains gas under pressure, one-way sealing means being provided to prevent the gas under pressure from reaching the passages and at the same time to allow oil to descend into the interspace through the passages, wherein said sealing means comprises an annular gasket (48; 148; 248) of elastomeric or similar material which has an inverted U- or V-shaped cross section and is arranged in the upper part of the interspace (44) so as to form a channel (50) which opens downwardly and is defined by two annular lips (52, 54; 252, 254) engaged with the inner cylinder (12) and the outer cylinder (10) respectively, one (52; 252) of which deforms elastically to separate from the respective cylinder and enable the oil to descend into the interspace (44), the deformable lip (52; 252) engaging the respective cylinder in an annular zone below the rim at the upper end (24) of the inner cylinder (12), wherein the deformable lip (52; 252) has an external face with a longitudinal profile which diverges upwardly relative to the respective cylinder so as to define, between the lip and the cylinder, an annular passage (56; 256) normally closed at its lower end by the contact between the lip and the cylinder, wherein an upper reinforcing washer (58; 158; 258) is connected to the gasket (48; 148; 248), wherein the radial shoulder (22) of the head (14) projects radially outwards relative to the inner cylinder (12), wherein the washer has a radially internal flat annular edge which engages the projecting part of the shoulder (22), and wherein said washer includes at least one notch which exposes at least a part of the upper mouth of said annular passage (56; 256).

2. Shock absorber according to claim 1, characterised in that the washer (58; 158; 258) is bonded to the gasket.

3. Shock absorber according to claim 2 or 1, characterised in that the deformable lip (52; 152) is engaged with the inner cylinder (12), and the washer (58; 158) has a ring of notches (60) in its radially internal annular edge which expose corresponding parts of the mouth of the passage (56).

4. Shock absorber according to claim 3, characterised in that, in correspondence with the head (14), the outer cylinder (10) has a widened upper part (18) which is connected to the remainder of the cylinder by a flared part (62), and in that the gasket has a widened upper part (64; 164) which overlies the flared part (62).

5. Shock absorber according to claim 4, characterised in that the washer (158) has an upwardly-turned peripheral flange (159) which is adjacent the widened part (18) of the outer cylinder (10) and overlies the flared part (62), and in that the widened upper part of the gasket (148) is formed by a layer of the gasket which is bonded to the peripheral flange (159) of the washer (148) and fills the annular space between the latter and the flared part (62) and widened part (18) of the outer cylinder (10).

6. Shock absorber according to claim 2 or 3, characterised in that the deformable lip (252) engages the outer cylinder (10) and the washer (258) has a radially-external circular edge which is spaced from the outer cylinder (10) to expose the mouth of the passage (256).

7. Shock absorber according to claim 6, characterised in that a collar (264) is fitted around the inner cylinder (12) and abuts the lower rim of the lip (254) of the gasket (248) opposite the deformable lip (252).

8. Shock absorber according to claim 7, characterised in that the collar (264) is a ring force-fitted onto the inner cylinder (12).

* * * * *